March 2, 1943. E. W. DAVIS 2,312,528
HOSE REEL
Filed Oct. 1, 1940 2 Sheets-Sheet 1

Inventor:
Ernest W. Davis
By Williams, Bradbury & Hinkle
Attys.

March 2, 1943.　　　　E. W. DAVIS　　　　2,312,528
HOSE REEL
Filed Oct. 1, 1940　　　　2 Sheets-Sheet 2

Patented Mar. 2, 1943

2,312,528

UNITED STATES PATENT OFFICE 2,312,528

HOSE REEL

Ernest W. Davis, River Forest, Ill., assignor to Stewart-Warner Corporation, Chicago, Ill., a corporation of Virginia Application October 1, 1940, Serial No. 359,268

14 Claims. (Cl. 299—78)

This invention relates to an apparatus for storing the hose used in dispensing lubricant in an automobile service station, and more particularly to an apparatus having a plurality of automatic rewind reels for storing separately, hose of the same or different diameters used in dispensing different types of lubricants or other fluids so that one or more of the hose may be reeled out or rewound without disturbing the hose not in use.

An object of the invention is the provision of an improved hose cabinet for storing on separate reels a plurality of hose of the type used in automobile service stations for dispensing different types of lubricants.

Another object of the invention is the provision of an improved automatic rewind reel mechanism for hose by which the hose is protected against damage and may be easily unwound to any desired extent.

Another object of the invention is the provision in a hose reeling device having a plurality of reels of means for driving each of the reels from a single motor for rewinding hose on said reels.

Another object of the invention is the provision of a hose cabinet having a plurality of reels of varying widths for storing hose of various diameters separated from each other.

Another object of the invention is the provision in a hose reel rewind apparatus having a plurality of reels of means for rotating one or more of the reels at a time for reeling in the unwound hose.

Another object of the invention is the provision of a hose cabinet having a plurality of reels and means for connecting each hose with a separate source of supply of lubricant to be dispensed.

Another object of the invention is the provision of a device for storing hose in which the hose is wound in a single layer on the reel.

Another object of the invention is the provision of an automatic rewind hose reel which may be remotely controlled by means of the hose itself and in which the hose is rewound under slight tension.

Other objects will appear from the following description, reference being had to the accompanying drawings in which.

Figure 1:
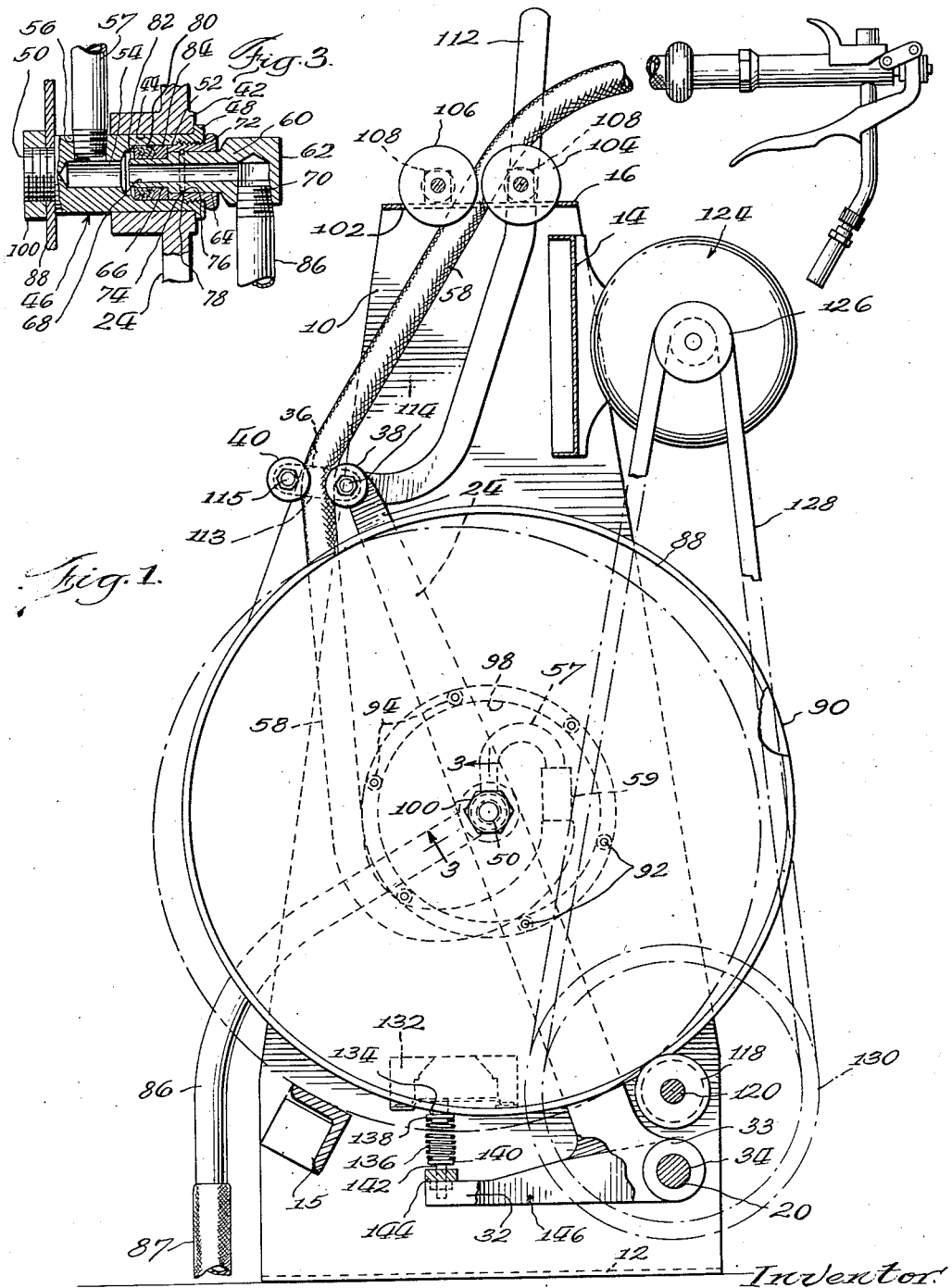
Fig. 1 is an end elevational view of the improved hose storage cabinet with the cabinet housing removed and with one end frame panel broken away to show a reel at the beginning of the rewinding operation.
Figure 2:
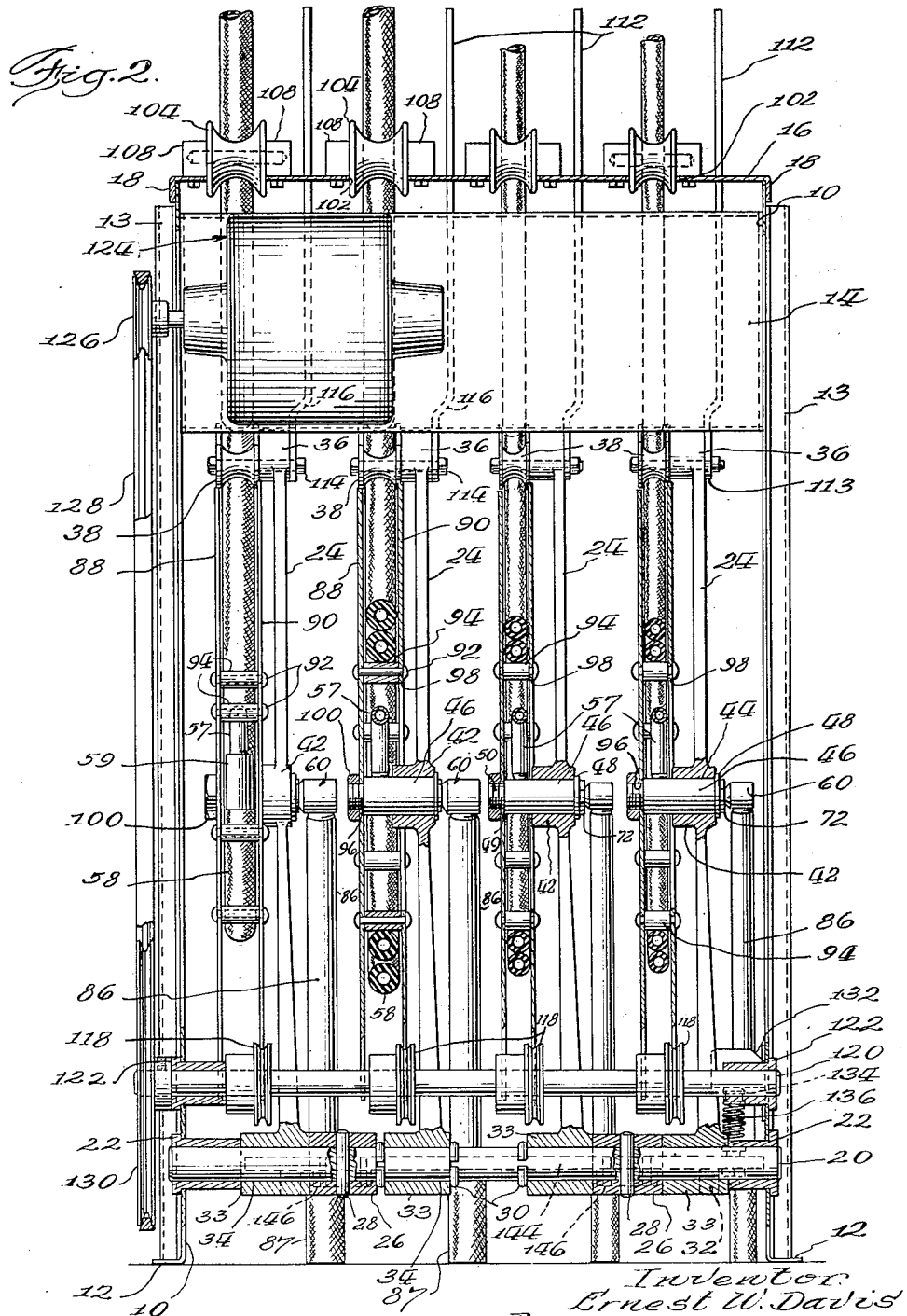
Fig. 2 is a front elevational view, partly in section, showing the manner of mounting the hose reels and the hose reel supporting arms and drivers; and, Fig. 3 is a sectional view taken on the line 3—3 of Fig. 1.

In the drawings, I have shown a device of the type used in automobile service stations for storing the hose through which different types of lubricants are dispensed, but the device is not limited to such use, and may be used wherever fluids are dispensed through a hose, and when built for automobile service station use, it may be provided with reels for storing the hose through which air or through which water is dispensed.

The supporting framework for the device comprises a pair of end panels 10 which taper toward their upper ends and have bottom edges bent outwardly at right angles to form supporting flanges 12. Reenforcing channels 13 may be welded or otherwise secured on the outside of the end panels to increase their strength and rigidity. The panels are secured in spaced relation by a flanged sheet metal front plate 14 extending between and secured to the upper ends of panels 10 and a cross bar 15 which may be in the form of an angle iron secured to the panels near the base thereof. The cross bar 15 is so positioned that it may serve as a stop against which the reels rest in their normal position. An apertured top plate 16 rests on the top edge of the end panels 10 and has flanges 18 on its ends which overlap the top edge of the end panels and are rigidly secured thereto in any suitable manner. The entire apparatus is preferably enclosed in a decorative and protective cabinet housing of suitable construction.

A shaft 20, which is journaled in bearings 22 mounted in the lower end near the front edge of the end panels 10, has a plurality of reel supports 24 rotatably mounted thereon, the hubs 33 of the supports being maintained in separated position by spacers 26 secured on the shaft 20 between each pair of supports by pins 28 and by split spring rings 30, which maintain the arms in contact with the spacers. The reel supports are inclined rearwardly and terminate at their lower ends in integrally formed rearwardly projecting arms 32. The upper ends of the supports are turned rearwardly and have bosses 36 formed thereon to which a pair of grooved rollers 38 and 40 are mounted, these rollers being spaced from each other a sufficient distance to permit the passage of a hose freely therebetween.

Approximately midway between the ends of each of the supports 24 and formed integrally therewith is a boss 42 having a bore 44 therein which receives a hollow stub shaft 46 (see Fig. 3). The stub shaft has a flange 48 on one end which abuts against the face of the boss 42 and has its opposite end extending through the bore 44 and terminating in a reduced threaded end 50.

The stub shaft 46 has an axial counter-bore 52 extending from the flanged end and communicating with an axial bore 54 of smaller diameter which terminates at a point near the reduced end of the shaft. Bore 54 is intersected by radial bore 56 which has threaded therein a U-shaped connecting pipe 57 (Fig. 1). The hose 58, through which lubricant or other fluid is to be dispensed, has one end attached to the free end of the U-shaped pipe by a coupling member 59.

A coupling member 60 has a head 62 and a cylindrical body part 64 with a reduced cylindrical end 66. An axial bore 68 extends from the reduced end of the coupling member 60 into the head 62 and is intersected by a threaded bore 70 in the head at right angles to the axial bore. In assembled relation, the coupling member 62 projects into the bore 52 in the stub shaft 46, and is rotatably secured in a packing gland 72 by a C spring 74 which rests in complementary annular grooves 76 and 78 formed in the coupling member 60 and the packing gland 72. The packing gland is threaded into the bore 52 of the stub shaft 46 and a fluid-tight swivel seal between the coupling member 60 and the stub shaft is provided by washers 80 placed on the reduced end of the coupling member and held in place by rings 82 and 84.

A pipe 86 is threaded into the bore 70 in the head of the coupling member 60 and has its other end connected to a conduit 87 which leads to a source of fluid to be dispensed. In operation, the fluid to be dispensed flows through the pipe 86 and the bore 68 in the coupling member out through the bore 54 in the stub shaft and into the pipe 57 to which the dispensing hose is connected.

Each reel comprises two discs 88 and 90 which are stamped from relatively soft sheet metal and are held in assembled relation by a plurality of bolts 92 which pass through the discs 88 and 90 at points equally distant from the center of the discs and through spacers 94 placed between the discs. The hose 58 is wound on the spacers, which may be of various widths in the different reels to accommodate different sized hose. The disc 88 has a centrally located opening 96 which fits over the reduced end 50 of the stub shaft 46. The disc 90, which is of slightly greater diameter than the disc 88, has a centrally located opening 98 which extends to the edge of the spacers and permits the assembled reel to be mounted on the stub shaft 46 when the U-shaped pipe 58 is connected to the shaft. The reel is clamped to the reduced end of the shaft 46 by a nut 100.

The top plate 16 has a number of rectangular shaped openings 102 therein corresponding to the number of reels and located directly above and in line with the reels. A pair of grooved rollers 104 and 106 are mounted over each opening 102 in bearing blocks 108 secured to the top plate along the edge of the opening. The rollers have their axes parallel to the axes of the reels and are spaced a sufficient distance to permit the hose from the associated reel to pass freely between them. When the hose is being rewound, it is guided to the reel by these rollers 104, 106 and 38, 40.

The top plate also has a series of elongated openings parallel with the openings 102 through which project the upper ends of generally L-shaped hand lever 112, each of which has an arm 113 at its lower end secured on the bosses 36 on the upper end of the supports 24, on the side opposite the rollers 38 and 40, by bolts 114 and 115, which also form supporting studs for rollers 38 and 40.

When the hose is being rewound, the reels are driven by grooved hardened steel drivers 118 which are nonrotatably mounted on a shaft 120 and so positioned that the larger disc 90 of each reel may be frictionally engaged in the groove of a driver. The shaft 120 rotates in bearings 122 mounted in the end panels 10 a short distance above shaft 20.

When the apparatus is in use, the relatively soft steel from which the discs 90 are stamped causes the peripheral edge thereof to assume the contour of the grooves in the hardened steel drivers 118 after a short period of use, thereby effecting better frictional engagement between the two.

An electric motor 124 may be bolted or otherwise secured to the front panel 14. The drive shaft 120 has a large pulley 130 thereon driven from a motor pulley 126 through a belt 128.

A push switch 132 for controlling the operation of the motor is secured to one of the end panels 10. Switch 132 is normally open and is closed by a push rod 134 which is urged upwardly by a compression spring 136 maintained between a seat 138 on the lower end of push rod 134 and a seat 140 on the upper end of a rod 142. Rod 142 is secured to a bar 144 which extends across the arms 32 on the supports 24 and is secured to an inwardly extending arm 146 on each of the spacers 26.

As shown in Fig. 1, when a support 24 is swung clockwise to bring a reel into position for rewinding hose, the arm 32 on the lower end of the support raises the bail formed by bar 144 and the arms 146 and closes the switch. The switch will remain closed as long as a support and reel are in position for rewinding hose. When the support and reel drop to their normal position, the compression in spring 136 is relieved and the switch 132 opens, thereby stopping the motor.

In their normal position, as shown in broken lines in Fig. 1, the discs 90 of the reels do not engage in the groove of the drivers 118, but rest on the cross bar 15. In this position, the hose may be freely unreeled merely by steadily pulling on the hose until the desired length has been unreeled.

At the beginning of a greasing operation, the operator will ordinarily unreel the entire length of hose from the reel so that the more remotely located parts of the automotive vehicle or other device being lubricated may be reached at any time without the necessity of stopping to unreel more hose. When it is desired to rewind the hose, the operator need merely pull the hose out to its full length and put sufficient tension on it to swing the support 24 clockwise and bring the disc 90 of the reel into engagement with its associated driver 118, as shown in Fig. 1.

As the support 24 is swung clockwise, the arm 32 raises the bar 144, which closes the motor switch 132 and causes the motor to rotate the driver shaft in a clockwise direction. Frictional engagement between the disc 90 and its associated driver causes the reels to be rotated in a counter-clockwise direction. As the hose rewinds, the operator merely follows it, keeping it under constant tension so that the engagement between the disc and driver is not broken. When the hose is completely wound on the reel, the operator releases it, thereby permitting the support 24 to swing by the force of gravity to its normal position and to disengage the disc 90 from its associated driver 118. By suddenly releasing the tension on the hose, it is possible to discontinue the rewinding at any time before the hose is fully rewound, if the operator so desires.

It should be noted that the support 24, the shaft 20 upon which it pivots, the stub shaft 46, and the driver shaft 120 are so located that a form of toggle-like action is obtained. The tensional force on the hose is multiplied through this toggle-like effect and exerted on the driver 118 through its associated disc 90 when the support is swung in a clockwise direction. This construction makes it possible to reduce greatly the force which must be applied to the hose to hold the disc and driver in working engagement. As a further means for increasing the force with which the disc is held in engagement with the driver, the guiding rollers 38—40 are offset rearwardly from both the guiding rollers 104—106 and the center of the reel, thereby setting up in the hose which is being rewound a component of force which is exerted on the upper end of the support and tending to force it toward the right (Fig. 1). This force is also exerted through the disc 90 on its driver 118 and is another factor tending to reduce the amount of tension which must be applied to the hose to keep the reel and driver effectively in engagement.

If the operator desires to rewind the unwound hose when less than all of it has been unreeled, the rewinding operation may be initiated by grasping the hose and by pulling it suddenly, thereby swinging the support and reel to rewinding position and thereafter maintaining the tension steady as the rewinding proceeds. The inertia of the reel is sufficient to prevent it from unwinding when the hose thereon is given a sudden jerk and instead, the support 24 is pivoted clockwise and carries the reel and disc 90 into engagement with the driver associated with the disc 90, the motor switch being simultaneously closed and the rewinding thereafter proceeding as previously described.

Rewinding of the hose may also be accomplished by pulling the lever 112 to the right (Fig. 1). This rotates its connected support 24 on the shaft 20 in a clockwise direction and swings the reel to the position shown in full lines with the periphery of the disc 90 engaged in the groove of the driver 118. Rotation of the support 24 causes the arm 32 to raise the bar 144 which closes the switch 132, whereupon the motor will rotate the shaft 120 and driver 118 in a clockwise direction, and the driver will impart to the reel a counterclockwise rotation, thereby winding in the hose. Rewinding may be stopped at any time by releasing the lever 112, whereupon the weight of the reel and hose causes the reel to drop back against the cross bar 15 out of contact with the driver.

While I have shown and described a particular form of my invention, it will be apparent to those skilled in the art that various changes and modifications may be made without departing from the basic principles of the invention. I therefore desire, in the following claims, to include within the scope of my invention all such equivalent constructions whereby substantially the results of my invention may be obtained by substantially the same means.

I claim:

1. A hose reeling apparatus comprising a rotatable hose reel, a hose adapted to be wound upon said reel, frictional driving means for said reel normally out of engagement therewith, and means including said hose and actuated by tension in said hose for effecting engagement between said driving means and said reel, thereby to rotate said reel for rewinding the hose.

2. A hose reeling apparatus comprising a rotatable hose reel, a hose adapted to be wound upon said reel, frictional driving means for said reel normally out of engagement therewith, a motor for rotating said driving means, a motor control switch, and means actuated by tension in said hose for effecting engagement between said driving means and said reel, said means simultaneously closing said switch to energize said motor.

3. A hose reeling apparatus comprising a plurality of rotatable hose reels, hose on said reels, drivers for rotating said reels normally out of engagement therewith, a motor for rotating said drivers, means for guiding the hose to said reels, and means individual to each reel for effecting engagement between one of said drivers and its associated reel, said means simultaneously causing said motor to operate, thereby to rotate said reels for rewinding the hose.

4. A hose reeling device comprising a plurality of pivoted reel supports, reels rotatably mounted upon the intermediate parts of said supports, a driver shaft having a series of grooved drivers secured thereon, a motor for rotating said driver shaft and drivers, a motor control switch, means on said supports for swinging said supports about their pivots to bring said reels into engagement with said drivers, and means for simultaneously closing said motor control switch to cause said motor to rotate said drivers and reels.

5. An automatic rewind hose reel apparatus comprising a hose reel, a hose adapted to be wound upon said reel, a movable support for said reel, means rotatable about a fixed axis and frictionally engaging said reel for driving said reel in a direction to rewind the hose thereon, and means including said hose for transmitting a force to said support in a direction to move said hose reel into engagement with said frictional driving means.

6. An automatic rewind hose reel apparatus comprising a hose reel, a hose adapted to be wound upon said reel, means rotatable about a fixed axis for driving said reel in a direction to rewind the hose thereon, a movable support for said reel normally maintaining said reel out of engagement with said driving means, and means including said hose for transmitting a force to said support in a direction to move said hose reel into engagement with said driving means.

7. An automatic rewind hose reel apparatus comprising a hose reel, a hose adapted to be wound upon said reel, means rotatable about a fixed axis for driving said reel in a direction to rewind hose thereon, a motor for rotating said driving means, a motor control switch, a movable support for said reel normally maintaining said reel out of engagement with said driving means, and means including said hose for transmitting a force to said support in a direction to move said hose reel into engagement with said driving means and simultaneously closing said motor control switch to energize said motor.

8. An automatic rewind hose reel apparatus comprising a hose reel, a hose adapted to be wound upon said reel, means rotatable about a fixed axis and adapted frictionally to engage said reel for driving said reel in a direction to rewind hose thereon, a support for said reel movable to its normal position by the force of gravity whereby said reel is normally maintained out of engagement with said driving means, and means including said hose for transmitting a force to said support in a direction opposed to the force of gravity to move said support and bring said hose reel into engagement with said frictional driving means.

9. An automatic rewind hose reel apparatus comprising a movable reel support, a hardened steel grooved driver rotatable about a fixed axis, a hose reel having a circular driven member of relatively soft sheet steel positioned in the plane of the grooves in said driver and normally out of engagement therewith, a hose adapted to be wound upon said reel, and means including said hose for transmitting a force to said reel in a direction to move said support and reel and cause the driven member of said reel to engage in the groove of said driver.

10. An automatic rewind hose reel apparatus comprising a pivoted reel support, a pivot for said support, a hose reel having a disc like driven member, a hose adapted to be wound on said reel, a driver rotatable about a fixed axis and adapted for frictional engagement with the driven member of said reel to rotate said reel in a direction to rewind hose thereon, means including said hose for applying a force to said support in a direction to move said support and bring the disc like driven member of said reel into engagement with said driver, and means including said pivot, support and disc like member for multiplying said force to firmly hold the disc like driven member in the groove of said driver.

11. An automatic rewind hose reel apparatus comprising a rotatable hose reel, a hose adapted to be wound on said reel, a support for said reel movable between a reel unwinding position and a reel rewinding position, said support being normally urged by gravity to reel unwinding position and being moved to reel rewinding position by tension in said hose, driving means rotatable about a fixed axis and frictionally engaging said reel to rotate said reel in a direction to rewind hose thereon when said support is moved to reel rewinding position, and means for transmitting tension in said hose in a direction to move said support to reel rewinding position, said support being moved by gravity to reel unwinding position upon release of the tension in said hose.

12. A hose reel cabinet apparatus comprising a plurality of movable supports, a hose reel rotatably mounted upon each of said supports, a frictional driving means for each of said hose reels, a common motor for operating all of said driving means, a switch for controlling the operation of said motor, means individual to each of said reels for causing it to be frictionally driven by its associated driving means, and means for closing said switch whenever any one of said reels is caused to engage its driving means.

13. A hose reeling apparatus comprising a plurality of rotatable hose reels, hose adapted to be wound upon said reels, drivers for said reels normally out of engagement therewith, an electric motor for rotating said drivers, a motor control switch, means for bringing said reels into engagement with said drivers and simultaneously closing said switch to cause said motor to rotate said reels for rewinding the hose, and rollers in pairs positioned above each reel and in line therewith for guiding the hose to said reels.

14. A hose reeling device comprising a plurality of pivoted reel supports, a plurality of hollow shafts rotatable in the intermediate part of said supports, a plurality of hose reels secured on said shafts, hose adapted to be wound on said reels, means including said shafts for conveying fluid from a source of supply to the hose on said reels, a plurality of grooved drivers for said reels normally out of engagement therewith, an electric motor for rotating said drivers, a motor control switch, levers constructed and arranged for pivoting said supports and bringing said reels into engagement with said drivers, and means for simultaneously closing said switch to cause said motor to rotate said drivers, and rollers in pairs positioned above each reel and in line therewith for guiding hose to said reels.

ERNEST W. DAVIS.